3,806,375
FORMING OXALATE CONVERSION COATINGS ON IRON OR STEEL

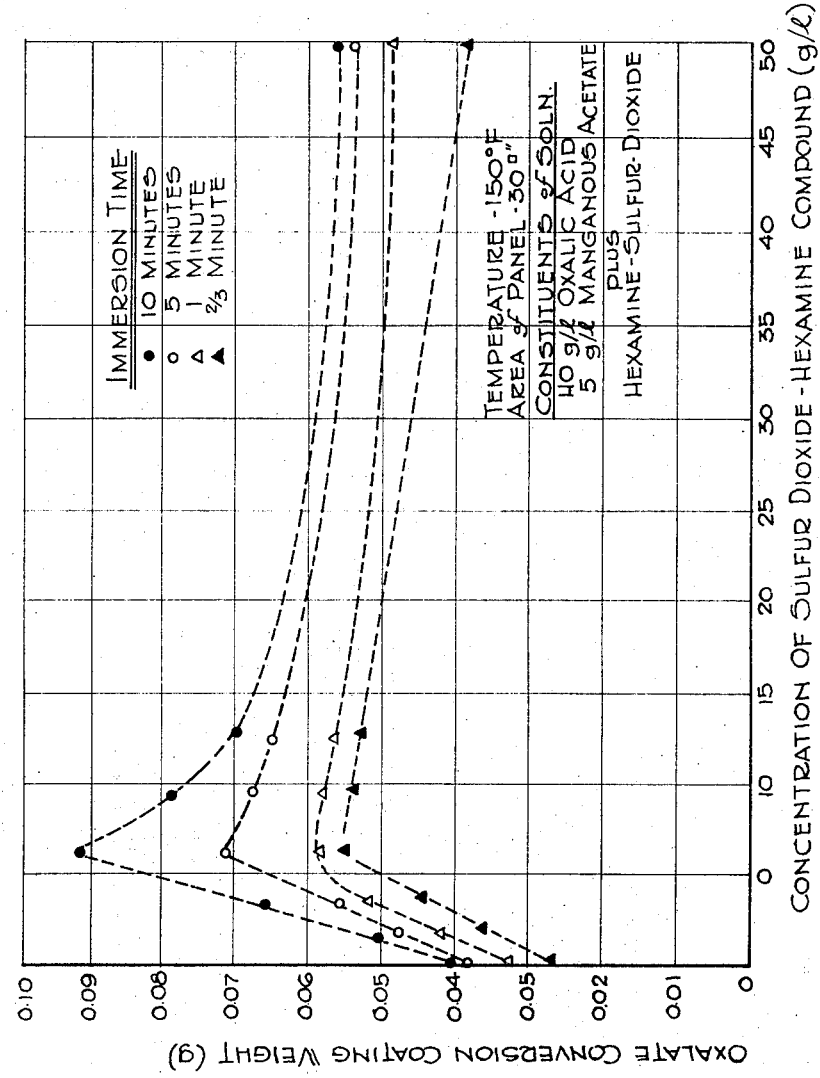

William McLeod, Ottawa, Ontario, and Gordon R. Hoey, Kanata, Ontario, Canada, assignors to Canadian Patents and Development Limited, Ontario, Canada
Filed Dec. 2, 1971, Ser. No. 204,021
Claims priority, application Canada, Jan. 12, 1971, 102,523
Int. Cl. C23f 7/20
U.S. Cl. 148—6.24                               7 Claims

ABSTRACT OF THE DISCLOSURE

The invention relates to an accelerator and grain refiner in the oxalate conversion coating process for metals, such as steel. The accelerator comprises the reaction product of hexamine and sulfur dioxide. It is formed by dissolving hexamine in a sulfurous acid solution and allowing the solution to stand for a period sufficient to allow formation of the reaction product. When used in an oxalate conversion coating bath, metal objects coated therein have a firmly adherent coating which is resistant to corrosive action, such as might occur in sulfur dioxide atmospheres. Oxalate coatings, produced as described, also serve as lubricants to prevent scratching of metal surfaces in metal forming processes.

---

This invention relates to oxalate conversion coatings on metal objects and more particularly to an accelerator and grain refiner for the process of producing such coatings.

Many accelerators of the reaction which forms oxalate conversion coatings on ferrous metals have been discovered and disclosed during the past fifty years. More recently, sulfur compounds such as bisulfites and thiosulfites were reported as oxalate conversion coating accelerators. These compounds are useful in facilitating the deposition of conversion coatings on metals and several of them have a grain refining action on the crystalline deposit.

The present invention seeks to provide an accelerator of improved stability and efficiency for the formation of oxalate conversion coatings on metals.

Reference to the accompanying drawing, the single figure of which is a diagram of curves representing conversion coating weight vs. concentration of the accelerator of the present invention, will be made in the ensuing description.

The accelerator of the present invention comprises the reaction product of hexamethylene tetramine (hexamine) and sulfur dioxide.

The accelerator is prepared by dissolving the hexamine in a solution of sulfurous acid. Preferably, a stoichiometric amount of hexamine is added to the solution, four molecules of sulfur dioxide combining with one molecule of hexamine combining to form the required compound in accordance with the stoichiometric equation:

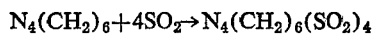

$$N_4(CH_2)_6 + 4SO_2 \rightarrow N_4(CH_2)_6(SO_2)_4$$

The exact structure of the compound was not illucidated, nor was the compound isolated from its aqueous solution. The concentration of $N_4(CH_2)_6(SO_2)_4$ in the solution may very widely but a concentration of 3 g./l. to 20 g./l. is preferred. The initial concentration of $SO_2$ in the solution is preferably about 2 g./l. to about 13 g./l. The pH of the accelerator solutions employed is preferably about 1.5–1.6.

Solid hexamine is added to the $SO_2$ solution and dissolved therein with stirring. The resulting solution is allowed to stand for a period of time sufficient for completion of the reaction. Since the reaction is slow at temperatures of 70–80° F., this period of time may be one to two days and usually about thirty hours. This reaction period may be shortened with higher temperature conditions (for instance, to about five hours at 120° F.) but there would be a tendency for the $SO_2$ to boil off unless the reaction was conducted under pressure. The reaction appears to result from the formation of a bond between the sulfur atom of $SO_2$ and the nitrogen atoms of the hexamine.

Production of the accelerator is simple, as evidenced by the following laboratory preparation of the compound.

EXAMPLE I $SO_2$ was bubbled into distilled water until there was a reasonably strong solution, i.e., about 32 g./l. of $SO_2$. A measured volume of this solution, 1 or 5 ml., was titrated against standard N/10 iodine solution, using starch solution as indicator. The solution was diluted to desired strength by addition of distilled water. Solid hexamine was added to the solution in the proportion of 17.5 g. hexamine to 32 g. $SO_2$.

The container was then sealed and the solution stirred for 10 minutes. The solution was allowed to stand for one to two days at room temperature.

The formation of the compound was shown by the following evidence, (a) There was no detectable smell of $SO_2$ gas from the solution, even when the solution temperature was raised to the boiling point (212° F).

(b) None of the sulfur dioxide added could be titrated with iodine solution.

(c) The compound could be decomposed by potassium permanganate in dilute sulfuric acid solution when the temperature was raised to the boiling point. Therefore, the compound was reasonably stable in aqueous solution because of its resistance to oxidation.

The accelerator is stable over long periods in an oxalic acid conversion coating bath. The stability of the accelerator solution in oxalic acid gives it many advantages over other sulfur additives which slowly decompose under acid conditions. It also means that in a conversion coating bath of the oxalic acid type, there is no loss of accelerator and oxalic acid can be replenished from stock, as the solution becomes exhausted. Furthermore, it can be used in any proportions which the user may require. Lastly, lower oxalic acid cocnentrations can be used to produce the same coating thickness, which also means that during long operations of the bath, or alternately a weekend shut-down period, there is a reduced amount of crysalline deposit formed on the base of the vessel.

Since the pH of the sulfurous acid-hexamine solution is about 1.5, almost identical with that of sulfurous acid alone, there is only a slight change in the pH of the oxalic acid coating bath solution (approximate pH 1.0–1.2) when the accelerator is added to it. The neutralizing action of the alkali salts of thio-acids when used in oxalic acid solution was entirely absent in experiments conducted in accordance with the invention.

In order to demonstrate the advantages of the invention, a series of experiments were conducted.

The panels used in the experiments were AISI 1010 steel and measured 12.70 cm. by 7.62 cm. by 0.1 cm., with a total area of 197.6 sq. cm. They were given the following surface treatment before immersion in the appropriate conversion coating bath. They were dry grit blasted to form thereon a clean etched surface with an even matte finish. They were then brushed with a nylon bristle brush. Traces of grease, if any, were removed by immersion in a trichloroethylene vapor bath. They were then dried, cooled to room temperature, and weighed.

One type of conversion coating bath was prepared by adding the accelerator solution to a solution containing oxalic acid and manganous sulfate. The oxalic acid concentration was varied from 10 to 50 g./l. The concentration of manganous sulfate depended on the "solubility product" of manganous oxalate which, in turn, depended on the oxalate ion concentration present in the bath. When the coating solution was made up with 10 g./l. oxalic acid, the maximum concentration of manganous sulfate was 12 g./l. If the bath contained 50 g./l. oxalic acid, the maximum concentration of manganous sulfate was 3.8 g./l. Manganous acetate, in place of manganous sulfates, was also used as an addition agent to the bath. Manganous ions were precipitated as oxalates on the surface of the immersed panel along with ferrous oxalate formed from ferrous ions dissolved from the steel panel.

In order to prevent the base of the panel from resting on th bath container, it was immersed in the bath by suspending it from a thread. This gave a uniform film on the panel. The panels were immersed for times varying from forty seconds to ten minutes. They were then withdrawn, rinsed in warm running water for about one minute, and dried by towel. After air drying for 15 minutes at 150° F. they were cooled to room temperature and again weighed. The difference in weights represented the net increase in weight as the amount of steel dissolved by the solution was not known.

Examination of the surface coatings produced by the experiments by X-ray diffraction methods revealed that they consisted of $FeC_2O_4 \cdot 2H_2$ and $MnC_2O_4 \cdot 2H_2O$.

The experiments employed manganous salts to supply the additional metallic coating ions and, while these are preferred, it will be understood that other suitable metallic salts, such as ferrous or zinc salts, or combinations thereof, may be used. There was no increase in the amount of deposit in the bath when these metallic ions were used.

The color of the coating was slate grey and it was unaffected by standing in air. Under a high power microscope the surface film appeared as a heterogeneous coating of dark grey, brown and colorless crystals. They were closely packed and evenly distributed on the surface which was apparently impervious to gaseous penetration.

The experiments are summarized in the following examples:

EXAMPLE II

Bath No. 1 formula:
  Reaction product:
    32 g./l. $SO_2$
    17.5 g./l. hexamine
  10 g./l. oxalic acid
  12 g./l. manganous sulfate
  pH=1.2; Temp.=150° F.

| Immersion time in bath (min.) | Net increase (wt. g.) | Coating thickness (mil) |
|---|---|---|
| ⅔ | 0.0307 | 0.14 |
| 1 | 0.0335 | 0.16 |
| 5 | 0.0413 | 0.17 |
| 10 | 0.0425 | 0.17 |

EXAMPLE III

Bath No. 2 formula:
  Reaction product:
    8 g./l. $SO_2$
    4.4 g./l. hexamine
  10 g./l. oxalic acid
  12 g./l. manganous sulfate
  pH=1.35; Temp.=150° F.

| Immersion time in bath (min.) | Net increase (wt. g.) | Coating thickness (mil) |
|---|---|---|
| ⅔ | 0.0320 | 0.16 |
| 1 | 0.0420 | 0.17 |
| 5 | 0.0430 | 0.17 |
| 10 | 0.0440 | 0.18 |

EXAMPLE IV

Bath No. 3 formula:
  Reaction product:
    4 g./l. $SO_2$
    2.2 g./l. hexamine
  50 g./l. oxalic acid
  3 g./l. manganous sulfate

| Immersion time in bath (min.) | Net increase (wt. g.) | Coating thickness (mil) |
|---|---|---|
| ⅔ | 0.0356 | 0.12 |
| 1 | 0.0416 | 0.13 |
| 5 | 0.0547 | 0.15 |
| 10 | 0.0625 | 0.16 |

EXAMPLE V

Bath No. 4 formula:
  Reaction product:
    32 g./l. $SO_2$
    17.5 g./l. hexamine
  50 g./l. oxalic acid
  3.8 g./l. manganous sulfate

| Immersion time in bath (min.) | Net increase (wt. g.) | Coating thickness (mil) |
|---|---|---|
| ⅔ | 0.0332 | 0.15 |
| 1 | 0.0493 | 0.15 |
| 5 | 0.0528 | 0.18 |
| 10 | 0.0521 | 0.18 |

EXAMPLE VI

Bath No. 5 formula:
  Reaction product:
    2 g./l. $SO_2$
    1.1 g./l. hexamine
  50 g./l. oxalic acid
  3 g./l. manganous sulfate
  pH=0.93; Temp.=150° F.

| Immersion time in bath (min.) | Net increase (wt. g.) | Coating thickness (mil) |
|---|---|---|
| ⅔ | 0.0420 | 0.12 |
| 1 | 0.0469 | 0.13 |
| 5 | 0.0500 | 0.14 |
| 10 | 0.0613 | 0.16 |

The following example of a proprietary bath coating efficiency is given for comparison purposes:

EXAMPLE VII

Bath No. 6: A proprietary bath with approximately 50 g/l. oxalic acid
  pH=1.1; Temp. 150° F.

| Immersion time in bath (min.) | Net increase (wt. g.) | Coating thickness (mil) |
|---|---|---|
| ⅔ | 0.0278 | 0.14 |
| 1 | 0.0310 | 0.16 |
| 5 | 0.0391 | 0.15 |
| 10 | 0.0378 | 0.15 |

In order to cover a fairly wide range of accelerator action, the concentration of the sulfur dioxide solutions was varied from 32 g./l. solution to 2 g./l. solution and the appropriate quantity of hexamine was added to these solutions to give the required strength of accelerator. For instance, a solution containing 4 g./l. $SO_2$ and 2.2 g./l. of hexamine (Example IV), when used as accelerator, gave a heavier weight deposited per panel, than baths containing a stronger proportion of accelerator, and also better results than those obtained using the proprietary bath (Example VII), although the thickness of the coating was only slightly affected. The results with this bath indicate that the coating has a high density. The low porosity of the coating was confirmed by the microscopic examination which showed a closely packed, dense crystalline surface.

In Examples II, III, IV, V and VI there is a steady increase in the net weight deposited on each panel, as the accelerator concentration is reduced.

It will be observed that there is relatively little increase in thickness after the first minute. The additional deposit fills the intercrystalline interstices, and makes the surface less porous.

Additional experiments were carried out with a view to determining the optimum range of concentrations of the accelerator. The accompanying drawing represents the results of these experiments. These are briefly summarized as follows for one concentration of acceleration close to the optimum.

EXAMPLE VIII

Bath formula:
Reaction product
4 g./l. $SO_2$
2.2 g./l. hexamine
40 g./l. oxalic acid
5 g./l. manganous acetate
pH=1.1; Temp.=150° F.

| Immersion time in bath (min.) | Net increase (wt. g.) | Coating thickness (mil) |
|---|---|---|
| ⅔ | 0.0561 | 0.12 |
| 1 | 0.0578 | 0.13 |
| 5 | 0.0708 | 0.17 |
| 10 | 0.0910 | 0.19 |

The following examples of proprietary processes are given for comparison purposes.

EXAMPLE IX

Bath formula:
4 g./l. sodium bisulfite
40 g./l. oxalic acid
5 g./l. manganous acetate
pH=1.2; Temp.=150° F.

| Immersion time in bath (min.) | Net increase (wt. g.) | Coating thickness (mil) |
|---|---|---|
| ⅔ | 0.0335 | 0.11 |
| 1 | 0.0438 | 0.12 |
| 5 | 0.0511 | 0.14 |
| 10 | 0.0522 | 0.14 |

EXAMPLE X

Bath formula:
2 g./l. sodium thiosulfate
20 g./l. boric acid
40 g./l. oxalic acid
pH=0.95 to 1.0; temp.=150° F.

| Immersion time in bath (min.) | Net increase (wt. g.) | Coating thickness (mil) |
|---|---|---|
| ⅔ | 0.0373 | 0.11 |
| 1 | 0.0409 | 0.12 |
| 5 | 0.430 | 0.12 |
| 10 | 0.474 | 0.13 |

Conversion coating baths were prepared by adding the accelerator to a solution containing oxalic acid and zinc sulfate. Results obtained with one of the baths are presented in Example XI. Coatings obtained using the zinc salt were more porous than those obtained with manganous salts.

EXAMPLE XI

Bath formula:
Reaction product:
32 g./l. $SO_2$
14 g./l. hexamine
5 g./l. oxalic acid
3 g./l. $ZnSO_4 \cdot 7H_2O$
pH=1.1; Temp.=168° F.

| Immersion time in bath (min.) | Net increase (wt. g.) | Coating thickness (mil) |
|---|---|---|
| 2 | | 0.22 |
| 5 | 0.0323 | 0.23 |
| 10 | 0.0452 | 0.22 |

Sodium oxalate or ammonium oxalate was used in the coating bath in place of oxalic acid, but the rate of deposition of the oxalate coating was lower than when oxalic acid was used. However such salts are operative according to the invention.

EXAMPLE XII

The accelerated sulfur dioxide corrosion test [J. Edwards. Sulfur Dioxide, Accelerated Corrosion Test— Testing Conditions and Equipment, Proc. Amer. Electroplates Soc., 46, 154–8 (1959)] provided evidence of the corrosive resistance of the coating when exposed to a sulfur dioxide environment and also confirmed the closer packing of the crystals when the hexamine-$SO_2$ accelerator was used. Table A below gives the results of corrosion tests in this apparatus in an atmosphere of 0.2% sulfur dioxide in air saturated with water vapor. The test time was to the breakdown of the surface film. Oxalate coatings formed from the accelerated and non-accelerated baths provided excellent corrosion resistance to the steel. However, the more densely packed and grain refined product from the hexamine-$SO_2$ accelerated baths gave a distinct advantage to this type of conversion coating. The close packing of the crystals made the surface impermeable to gaseous penetration which resulted in greater corrosion resistance.

TABLE A

Accelerated corrosion testing of various coatings in water-vapor saturated air containing 0.2% $SO_2$

| Type of coating: | Test time to first formation of rust, hrs. |
|---|---|
| Uncoated steel | 7 |
| Phosphate coating | 16 |
| Chromium plating (0.1 mil) | 51 |
| Oxalate coating (no accelerator) | 120 |
| Oxalate coating (hexamine-$SO_2$ accelerator) | 168 |

EXAMPLE XIII

Oxalate coated panels prepared from the hexamine-$SO_2$ accelerated bath and from two other baths, one accelerated with sodium thiosulfate and the other with sodium bisulfite, were painted and corrosion tested in the neutral salt spray cabinet. Each panel was painted with undercoat primer and enamel dip application. Panels were dried for a minimum of one week before being submitted to the salt spray test.

Examination of the panels after 500-hr. exposure to salt spray revealed that oxalate coatings formed from the hexamine-$SO_2$ accelerated bath when painted withstood the test most successfully.

We claim:

1. An accelerator for an oxalate conversion metal coating process which comprises a stable aqueous solution of the reaction product of hexamine and sulfur dioxide, wherein said reaction product is formed in accordance with the following stoichiometry:

$$N_4(CH_2)_6 + 4SO_2 \rightarrow N_4(CH_2)_6(SO_2)_4$$

2. Method of producing an accelerator for an oxalate conversion metal coating process which comprises dissolving hexamine in a sulfurous acid solution, and allowing the resulting solution to stand for at least about 24 hours at 70–80° F. for formation therein of a stable aqueous solution of the reaction product of hexamine and sulfur dioxide, wherein said reaction product is formed in accordance with the following stoichiometry:

$$N_4(CH_2)_6 + 4SO_2 \rightarrow N_4(CH_2)_6(SO_2)_4$$

3. Method for the conversion coating of ferrous metal objects which comprises immersing said objects in an oxalic acid or oxalate bath comprising a stable aqueous solution of the reaction product of hexamine and sulfur dioxide in a concentration of at least 3 g./l., said reaction product being formed in accordance with the following stoichiometry:

$$N_4(CH_2)_6 + 4SO_2 \rightarrow N_4(CH_2)_6(SO_2)_4$$

4. Method for the conversion coating of ferrous metal objects as defined in claim 3 wherein the bath contains metallic coating ions.

5. Method for the conversion coating of ferrous metal objects as defined in claim 3, wherein the concentration of said reaction product in said bath is about 3 g./l. to 20 g./l.

6. Method for the conversion coating of ferrous metal objects which comprises immersing said objects in an oxalic acid or oxalate bath containing metallic coating ions and an accelerator comprising a stable aqueous solution formed by reacting hexamine with sulfur dioxide in a sulfurous acid solution, the reaction product being present in a concentration of at least 3 g./l., wherein said hexamine and sulfur dioxide were present in stoichiometric proportions for $N_4(CH_2)_6(SO_2)_4$ and wherein said sulfurous acid solution has an initial concentration of about 2 g./l. to about 13 g./l. of $SO_2$.

7. Method for the conversion coating of ferrous metal objects as defined in claim 6, wherein said metallic coating ions are manganous, ferrous, or zinc or combinations thereof.

References Cited
UNITED STATES PATENTS

| | | | |
|---|---|---|---|
| 2,721,875 | 10/1955 | Dickert et al. | 260—456 A |
| 2,759,862 | 8/1956 | Henricks | 148—6.24 |

RALPH S. KENDALL, Primary Examiner

U.S. Cl. X.R.

148—6.14 A; 260—456